United States Patent Office 3,088,893
Patented May 7, 1963

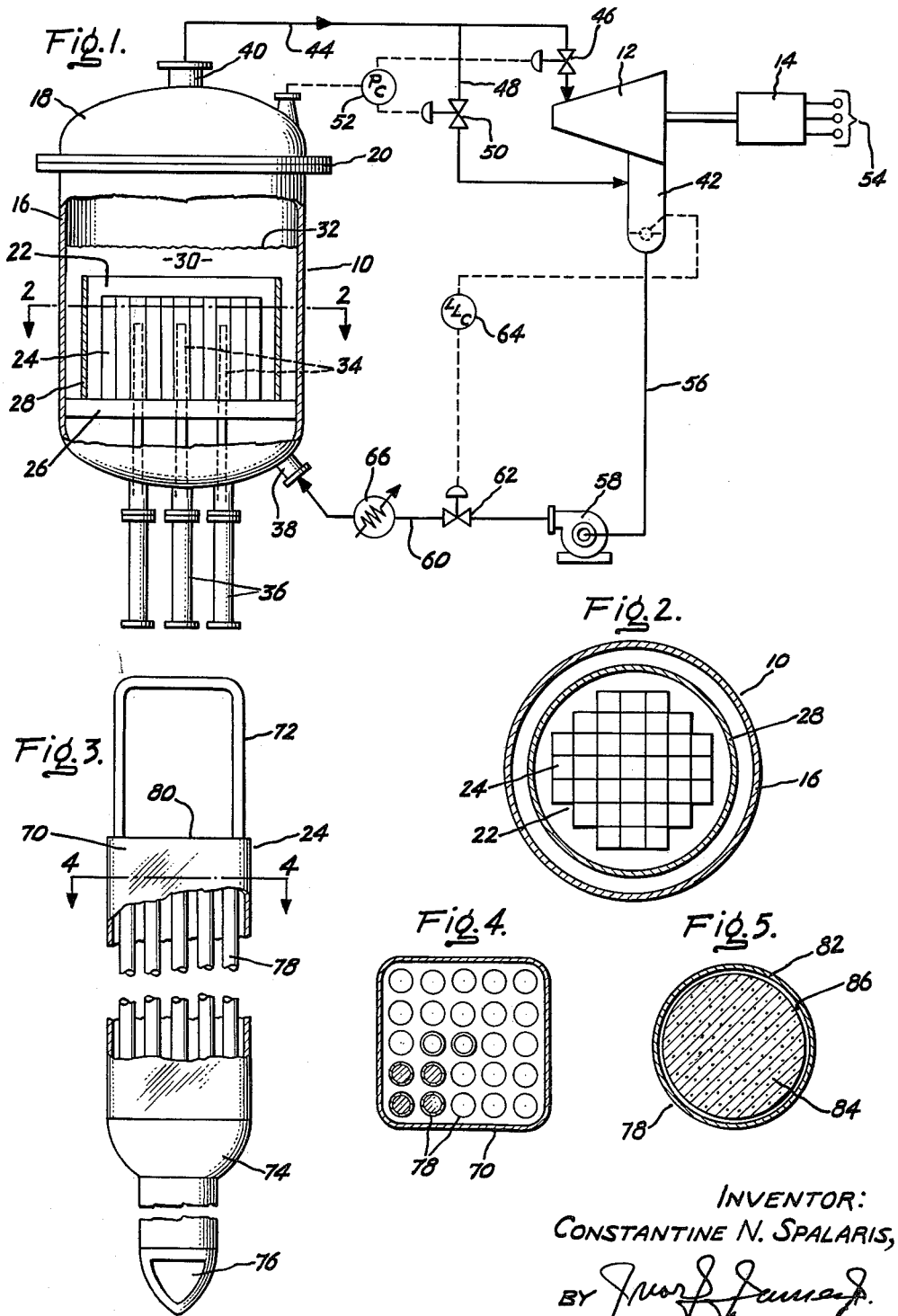

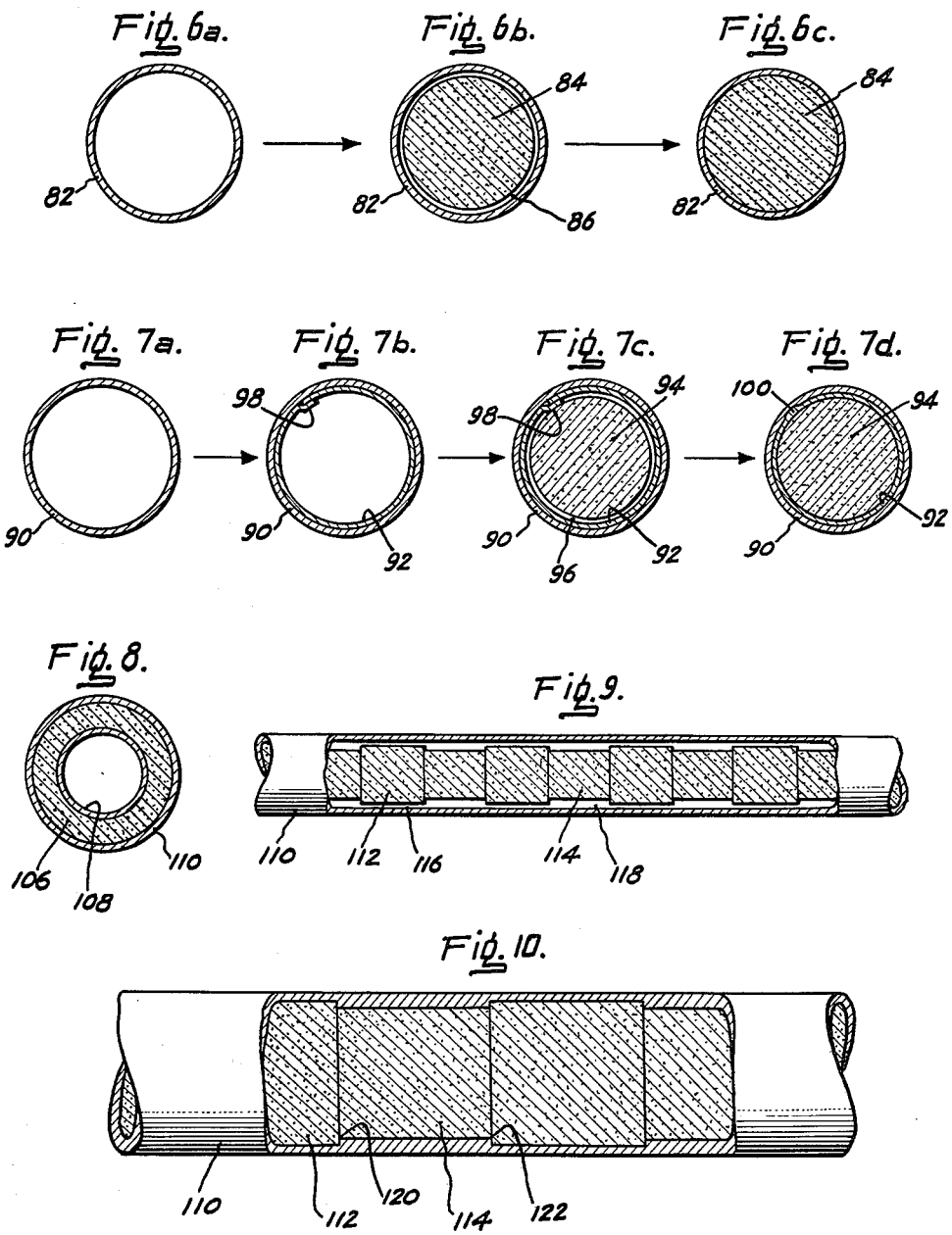

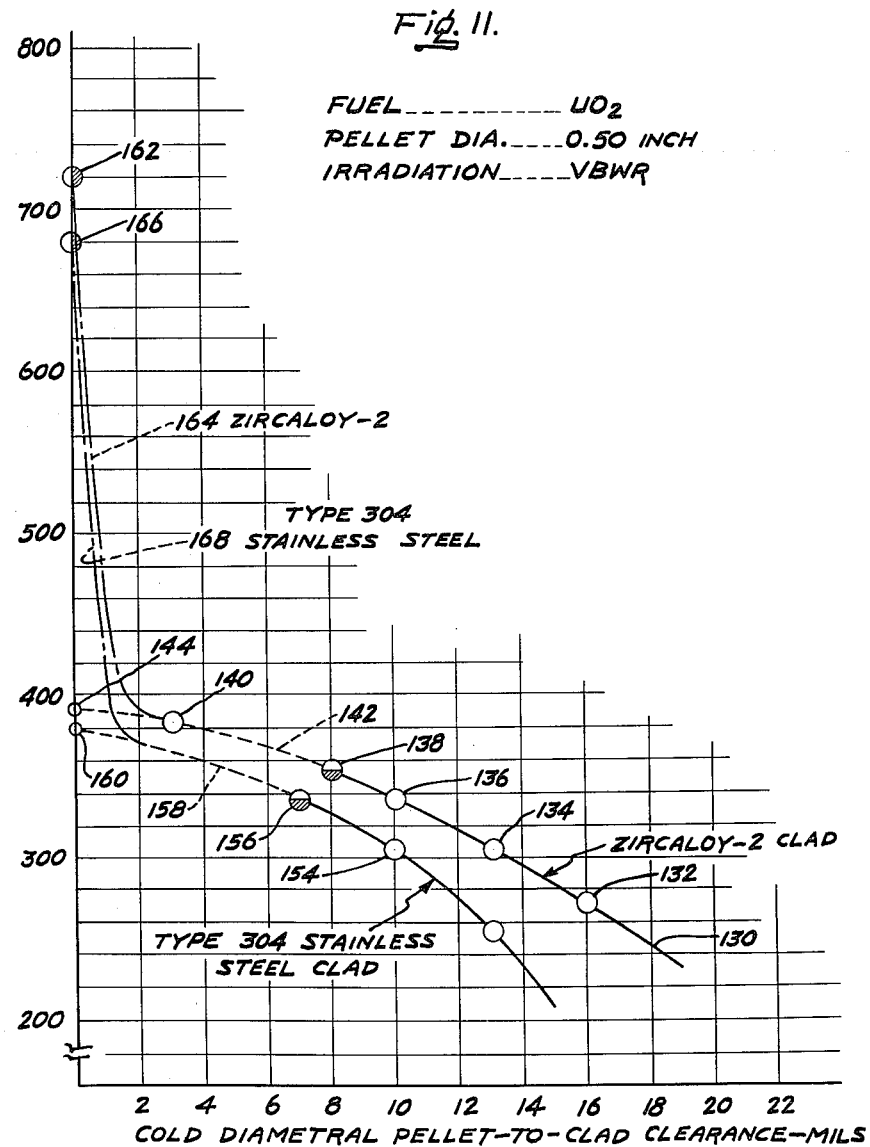

3,088,893
MALLEABLE TUBE-CLAD ARTICLE AND MANUFACTURING METHOD THEREFOR
Constantine N. Spalaris, San Jose, Calif., assignor to General Electric Company, a corporation of New York
Filed Aug. 31, 1960, Ser. No. 53,281
13 Claims. (Cl. 204—154.2)

This invention relates generally to malleable tube-clad articles, and it relates more particularly to the liberation of thermal energy in nuclear reactors by means of a self-sustained chain nuclear fission reaction, to an improved fuel element for reactors; and improved methods for the manufacture of such articles and fuel elements.

The release of large amounts of energy through nuclear fission reactions is now quite well known. In general, an atom such as $U^{233}$, $U^{235}$, $Pu^{239}$, or $Pu^{241}$, fissionable by thermal neutron capture, absorbs a thermal neutron in its nucleus and undergoes a nuclear disintegration. This produces on the average, two fission products of lower atomic weight and great kinetic energy, several high energy neutrons, and energetic gamma radiation. For example, the fission of a single atom of $U^{235}$ produces a light fission product and a heavy fission product with mass numbers ranging between 80 and 110 and between 125 and 155 respectively, and an average of 2.5 neutrons. The total energy release approaches about 200 mev. (million electron volts) per fission event.

The kinetic energy of the neutrons and fission products is quickly dissipated, primarily in the nuclear fuel, as heat. If after this heat generation there is at least one net neutron remaining which induces a subsequent fission, the fission reaction becomes self-sustaining and the heat generation is continuous. The heat is removed by recirculating a coolant through heat exchange relationship with the nuclear fuel and a heat sink. The reaction may be continued as long as sufficient fissionable material remains in the system to override the effects of the fission products which also may be present.

In order to maintain such fission reactions at a rate sufficient to generate useful quantities of thermal energy, nuclear reactors are presently being designed, constructed, and operated in which the nuclear fuel is contained in fuel elements which may have various shapes, such as plates, tubes or rods. These fuel elements are usually provided with a corrosion resistant heat conductive clad on their external surfaces, and are grouped together at fixed distances from each other in a coolant flow channel or region as a fuel assembly. A sufficient number of fuel assemblies are so combined in an array or lattice to form the nuclear reactor core capable of the self-sustained fission reaction referred to above. The core may be enclosed within a reactor vessel through which a coolant is circulated, or the coolant may otherwise be passed through the fuel-containing flow channels.

The nuclear fuel for such reactors contained in the fuel elements can be in the elemental form. Such form includes metallic uranium, plutonium or thorium, and alloys of these metals with each other, or with other metals having low neutron absorption cross sections. Since the metallic forms of uranium at least have a strong tendency to deform during extended neutron irradiation, most reactors currently designed for long periods of operation are provided with fuels in which these fissionable materials are present in compound form. Suitable compounds include the oxides, carbides, silicides, nitrides, sulfides, or other refractory or ceramic compounds of uranium, plutonium, and thorium. Such materials tend to be physically stable over long term irradiation. These refractory materials, due to their extremely high melting points which range from 4000° F. to about 5000° F., are customarily prepared by powder metallurgy techniques in which the finely divided material is either pressed or extruded to form compacts of intermediate density. These compacts are subsequently heated to elevated temperatures on the order of about 80% of their melting points to effect sintering and densification. The sintered products are hard, brittle, vitreous materials having densities in the range of 95 to 98% of the theoretical density of the particular material.

These sintered nuclear fuel pellets, when prepared for use in power reactors, are customarily in cylindrical shapes, either solid or hollow, and are inserted into metallic clad tubes, which tubes are then sealed at each end to form the nuclear fuel element. In manufacture of such elements, however, a finite radial distance between the outer surface of the pellet and the inner surface of the clad tube is required. This radial distance or clearance must be greater than 0.003 inch in order to permit insertion of the pellet into the tube. However, as a practical matter, the tolerance on the inside dimension of metal clad tubing is ±0.002 inch, and the tolerance on the outside dimension of the pellet is ±0.001 inch assuming each pellet is ground to size in a centerless grinder. These tolerances accumulate and require that the inside diameter of the tube be greater than the outside diameter of the pellet by an amount which provides an annular gap between the two of about 0.009 inch.

This gap ultimately fills with fission product and other gases evolved from the fuel during irradiation. Such gas has a relatively low thermal conductivity and impedes the heat transfer from the nuclear fuel pellet inside the tube to the coolant outside the tube. The result is either a reduced permissible heat transfer rate for a given maximum center fuel temperature, or an excessive rise in the center fuel temperature (which may even result in melting of the fuel) for a given heat transfer rate. Center melting of the fuel is undesirable in that it permits the release of fission gases and causing pressure buildup within the clad tube.

One attempt to minimize this problem has been to fill this gap during manufacture with an inert gas having a relatively high thermal conductivity, such as helium The improvement here is only temporary since gases involved during irradiation have substantially lower thermal conductivities, they dilute the helium, and reduce its original effectiveness.

Another attempt to overcome the problem involves the use of a very thin clad tube, one whose thickness is insufficient to render it self-supporting against the external application of coolant or moderator fluid pressure at the reactor operating value. This external pressure causes the thin clad tube to collapse around and be supported by the nuclear fuel. This collapse and the attendent circumference reduction results in the formation in the clad tube of one or more small longitudinal wrinkles. Beneath these wrinkles the volume previously occupied by the gap is concentrated. The gas accumulates beneath this wrinkle, and through this region heat transfer resistance is even higher than it is through the gap. A local hot spot results, high localized stressing of the clad is caused, and ultimately the clad tube fractures at the apex of the wrinkle, causing fuel element failure.

Another attempt to overcome the problem involves the fabrication of fuel elements from clad tubes and fuel pellets very carefully selected according to size. This requires that the internal diameter of the tubes and the external diameter of the pellets be held at exact values without the usual tolerances as discussed above. Wet grinding of other pellets in a centerless grinder may introduce water which may have very adverse effects at high temperature under irradiation. In any event, the minimum gap of about 0.003 inch remains, it being required to permit inserted pellets to slip through the tube during filling.

Another previous attempt has involved the longitudinal stretching of the pellet-filled clad tubes to reduce the diameter of the tube and cause it to rest directly against the external surface of the pellet. These attempts have all met with failure since elastic properties of the tube cause "spring-back" which leaves radial gaps of about 0.002 inch around the largest pellets and up to about 0.007 inch gaps around the smaller pellets. This technique is especially bad with zirconium alloy clad tubes. These tubes break readily and unexpectedly under this treatment because the ultimate strengths of these alloys are not sufficiently higher than their yield strengths.

Still another attempt to overcome this problem has involved the compaction of powdered nuclear fuel in the clad tubes. These techniques involve filling the tube with powdered nuclear fuel, densifying the powder to the greatest extent possible by vibratory techniques or otherwise, subsequently sealing the filled tubes, and then rolling them to effect diameter reduction and power compaction. Although this results in a zero gap between the fuel and the clad tube, other serious disadvantages result. The compacted powder seldom, if ever, exceeds a density of about 88% of the theoretical density of the material used. This is to be compared with the 97–98% realized with sintered materials. Further, if the clad tube fails and begins to leak, loss of the powdered fuel through the opening into the ambient fluids is likely. Specifically in light or heavy water cooled or moderated reactors using uranium dioxide fuel, the dissolved oxygen present in the system coolant or moderator very rapidly oxidizes the fuel to the higher uranium oxide, $U_3O_8$, due to the very high surface area presented by the powdered fuel. This change in oxidation state results in a 10% volume increase in the fuel which is sufficient to rupture the tubes. Still further, fission gas release from powdered fuel is believed by many to be excessively high, thereby generating high internal pressures in the clad tube.

The present invention is directed to an improved malleable tube-clad article, specifically a nuclear fuel element, and a method for producing it, to overcome all of the aforementioned problems.

It is an object of this invention to provide a more efficient and reliable nuclear fuel element of the rod or tube type for use in nuclear chain fission reactors.

It is another object of this invention to provide an improved method for the production of such improved nuclear fuel elements.

Other objects and advantages of the present invention will become apparent to those skilled in the art as the description and illustration thereof proceed.

Briefly, one aspect of the present invention comprises a method for the production of improved malleable tube-clad articles, such as nuclear fuel elements, including the steps of swaging a malleable clad tube containing at least one hard high density material body of cylindrical shape by means of swaging dies having a circular opening when the dies are in the contracted position, the diameter of said opening being between about 0.2% and 2.5% less than the outside diameter of the tube following swaging, to produce an article having a body-to-clad gap of zero.

Another aspect of this invention comprises the manufacturing method defined in the paragraph immediately preceding, in combination with the step of providing in the clad tube, by insertion prior to swaging and either prior to or simultaneously with the introduction of the material bodies, a thin metallic foil liner at a position between the outer surface of the bodies and the internal surface of the clad tube to protect said internal surface from adverse effects of fluids issuing from the bodies during use.

Another aspect of the present invention includes the improved malleable tube-clad articles, such as nuclear fuel elements, comprising a clad tube substantially filled with high density material bodies of cylindrical shape and of approximately its theoretical density, and having a body-to-clad gap of zero, produced by either of the procedures defined in the two paragraphs immediately preceding.

The present invention and its distinctions and advantages over the prior art will be more readily understood by reference to the following description of the present invention as it applies to the production of malleable tube-clad rod-type nuclear fuel elements, and to accompanying drawings in which:

FIGURE 1 is a schematic flow diagram of a nuclear chain fission reacting assembly or core enclosed in a pressure vessel shown in partial cross section and connected to generate useful mechanical or electrical power from the thermal energy released in the assembly;

FIGURE 2 is a transverse cross section view of the reactor vessel and its contents shown in FIGURE 1;

FIGURE 3 is a vertically fore-shortened longitudinal view in partial cross section of an assembly of rod-type nuclear fuel elements and suitable for use in the reactor illustrated in FIGURES 1 and 2;

FIGURE 4 is a transverse cross section view of the nuclear fuel assembly shown in FIGURE 3;

FIGURE 5 is a transverse cross section view of a prior art fuel element of the rod type and which can be used in the fuel assembly of FIGURES 3 and 4;

FIGURE 6 is a schematic illustration showing, by means of several transverse cross section views of the clad tube and the nuclear fuel, the method of this invention applied to produce one form of the improved nuclear fuel element according to this invention;

FIGURE 7 is a schematic illustration similar to that of FIGURE 6 but showing the method of this invention applied to produce another form of improved nuclear fuel element having a clad tube liner according to this invention;

FIGURE 8 is a single transverse cross section view of a hollow or tubular nuclear fuel element clad both on its internal and external surfaces and produced by the methods of this invention;

FIGURES 9 and 10 are longitudinal partial cross section views of the filled clad tube before (FIGURE 9) and after (FIGURE 10) the swaging operation according to this invention; and FIGURE 11 is a graphic presentation of the thermal performance of nuclear fuel comprising sintered pellets of uranium dioxide 0.5 inches in outside diameter in metal clad tubes as a function of the variation in the fuel-to-clad gap.

Referring now to FIGURE 1, a nuclear reactor of the type moderated and cooled by boiling light water, i.e., the natural isotopic mixture, and adapted to utilize nuclear fuel according to the present invention, is shown in a system connected to produce electrical energy. This system includes nuclear reactor 10, turbine 12, and generator 14. The nuclear reactor includes pressure vessel 16 having a removable vessel head 18 connected by means of flanges indicated at 20. The pressure vessel contains a nuclear chain fission reacting assembly or core 22 made of a plurality of vertically elongated, nuclear fuel-containing fuel assemblies 24. The fuel assemblies are open at their lower and upper ends to permit the upward flow of cooling water, which in this reactor also functions as neutron moderator. Fuel assemblies 24 are supported in vessel 16 by means of core support means 26. A thermal shield 28 is also supported by support means 26, it surrounds core 22, is cooled with the same fluid as the fuel, and serves to attenuate gamma ray and other radiation from the core to inhibit the heating of the walls of pressure vessel 16. Pressure vessel 16 also contains a body 30 of light water having an upper surface 32 at which steam generated in core 22 is separated from the water. The rate of nuclear fission reaction existing in core 22 is controlled by the position of control rods 34 (strong thermal neutron absorbers) extending upwardly into the core and which are reciprocable there by means of control element drive mechanisms 36. The rate of fission reaction and of heat liberation (power level) in core 22 is raised by withdrawing control elements 34, and lowered by inserting them. Feedwater is introduced in the bottom of vessel 16 through coolant inlet 38 at a rate which is substantially equal to that at which steam generated in the core is removed from the top of the vessel through steam outlet 40.

Turbine 12, provided with condenser 42, is driven by steam produced in the reactor core and passed directly through outlet 40 by means of line 44 at a rate controlled by a valve 46. In case the load on the turbine is rapidly decreased and the then existing steam flow is excessive, some or all of the steam may be by-passed around turbine 12 directly to condenser 42 through line 48 controlled by valve 50. Valve controller 52 is provided to actuate inlet valve 46 and by-pass valve 50 in response to the system pressure. Controller 52 acts to open inlet valve 46 and close by-pass valve 50 simultaneously, and vice versa.

Turbine 12 drives electric generator 14, both of which are conventional commercially available items of equipment. The generator 14 is provided with output terminals 54 which are adapted to be connected to any suitable load, such as through a step-up transformer to a transmission line.

Condensate is removed from condenser through line 46 and is pumped by means of condensate and feedwater pumps, here indicated as pump 58, through line 60. This flow rate is controlled by valve 62 in response to liquid level controller 64, which in turn is actuated by the liquid level present in the hot well of condenser 42. The feedwater is passed through one or more feedwater heaters, here indicated as 66, and in which the feedwater temperature is raised to a value about equal to, and preferably somewhat less than the boiling temperature in nuclear reactor 10.

FIGURE 2 is a transverse cross section view of reactor 10 shown in FIGURE 1. This view clearly shows the coaxial relationship of reactor vessel 16, thermal shield 28, and the plurality of fuel assemblies 24 arranged in the regular pattern shown to form reactor core 22.

FIGURE 3 is a foreshortened view in partial cross section of a fuel assembly 24. This particular fuel assembly consists of an elongated flow channel 70, here having a square cross section. It is provided with a lifting bale 72 at the upper end and a nose or support piece 74 provided with coolant inlet opening 76 at its lower end. The elongated fuel rods 78, spaced apart from one another in a regular array, are supported in fixed positions with respect to one another within channel 70. Coolant water enters lower opening 76, flows upwardly through channel 70, moderates the fast neutrons generated in the fission reaction, and is at least partially vaporized by the heat liberated in the nuclear fuel to form steam. The mixture of steam and boiling water discharges from the upper open end 80 of the fuel assembly.

FIGURE 4 illustrates a transverse cross section view of the fuel assembly of FIGURE 3 and shows the regular arrangement of fuel rods 78 in a spaced array having a square pitch within flow channel 70.

FIGURE 5 shows an enlarged transverse cross section view of a fuel rod 78. The fuel rod consists of an outer clad tube 82, and a body of nuclear fuel 84 contained within the tube. This nuclear fuel can be any of those referred to below, but a common fuel for light water cooled and moderated boiling reactors is slightly enriched uranium dioxide ($UO_2$). A small gap 86 appears in FIGURE 5 between the outer surface of nuclear fuel 84 and the inner surface of clad tube 82. This is a prior art fuel rod, and the previous need for and disadvantages of this fuel-to-clad gap 86 have been described above.

In the subsequent descriptions of FIGURES 6–11, the mechanical details, the advantages, and methods of making significantly improved nuclear reactor fuel of the rod type according to this invention are described. The improved fuel according to this invention comprises high density cylindrical shapes or bodies, such as one or more sintered pellets or extrusions of $UO_2$ having densities of about 98% of its theoretical density, contained within a clad tube whose inner surface is in continuous and direct contact with the outer surface of the nuclear fuel bodies. There is no gap between these two surfaces and within which gases accumulate to impede heat transfer from the fuel across the gap into the ambient coolant. It has not heretofore been possible to produce fuel elements, containing high density fuel bodies, without this fuel-to-clad gap. A method has been found, according to this invention, by means of which such fuel elements can be prepared. Testing of such elements has shown that highly unusual and unexpected improvements in fuel performance result. This improvement involves, in general, the approximate doubling of the maximum permissible heat transfer rates at which a rod type nuclear fuel element can be operated in a nuclear reactor without exceeding the melting point of the fuel at the center of the fuel rod, or causing void formation in this region. The improved fuel performance permits the approximate doubling of the power output of a given reactor. These results are also highly unexpected because, although there was no known previous process for producing rod type nuclear fuel having a zero fuel-to-clad gap, the experimental heat transfer data for this kind of fuel having gaps of various sizes were reliable and could be extrapolated to a theoretical zero gap in order to estimate the probable maximum thermal performance to be expected. High density $UO_2$ fuel having zero gap has been fabricated according to the principles of the present invention. It has been irradiated in the Vallecitos Boiling Water Reactor (VBWR) located near Pleasanton, California, and the thermal performance of such fuel has been determined. It has now been found that the heat transfer rate at which center melting and void formation begin in this improved fuel is approximately 200% of that which would be expected from the extrapolation of the known performance of the prior art fuel.

Referring now to FIGURE 6, several views are shown illustrating the various steps in producing one form of improved nuclear fuel by means of the process of this invention. The description of FIGURE 6 will be conducted in the form of a specific example of one embodiment of this invention employed to manufacture rod type nuclear fuel having a stainless steel clad tube containing slightly enriched (about 3.50% $U^{235}O_2$) in the form of 98% dense pellets. The incoming stainless steel tubing had an outside diameter of 0.432 inch and a nominal wall thickness of 0.015 inch. The nominal inside diameter of the tube was 0.402 inch. This tubing was cut into 37.81 inch lengths. The outside surface was cleaned for a length of about 0.125 inch from each end, and one end plug was welded to each tube. If desired, this plugging may be done with a temporary removable plug. A transverse cross section view of the clad tube 82 at this stage is shown in FIGURE 6a.

The clad tube 82 is then loaded with 72 sintered slightly enriched $UO_2$ pellets having a length of about 0.5 inch and a nominal outside diameter of 0.390 inch. In the practice of the invention, these pellets were not ground or selected to close tolerances and the outside diameters of these pellets varied from a minimum value of 0.389 inch and a maximum of 0.397 inch. A transverse cross section view of the thus filled fuel rod is shown in FIGURE 6b showing the UO₂ pellets 84 enclosed in clad tube 82 with gap 86 between them.

The thus filled clad tubes 82 are then trimmed to length, evacuated to remove the air, back filled to atmospheric pressure with pure helium, and sealed at the open end by welding in a second end plug. Both ends may be sealed if a temporary plug was used before filling the tube with fuel pellets. A space of approximately 1.0 inch in length is left at one end of the tube. This fuel rod segment was then swaged in a swaging mill using alloy steel dies of unusual design. The die opening when in the contracted position is perfectly circular, rather than oval as in the conventional swaging mill practice. This has been found necessary in order to reduce the fuel-to-clad gap to zero and to avoid fracturing the fuel pellets. The diameter of the circular opening of the swaging dies must be between about 0.2 percent and about 2.5 percent less than the desired outside diameter of the finished fuel rod. In the present case, the finished outside diameter varied from 0.426 to 0.427 inch, and a circular die 0.424 inch in diameter was used. The length of the fuel rod increased to 38.5 inches and the diametrical clearance between the fuel and the clad disappeared, that is, the fuel-to-clad gap was 0.000 inch. A transverse cross section view of the fuel in this stage is shown in FIGURE 6c, it is apparent that gap 86 has disappeared. Photomicrographs taken of transverse sections of fuel manufactured according to this invention show indeed that the fuel-to-clad gap is zero.

In the process described in FIGURE 6, the diametrical reduction of the clad tube should be kept below about 2.5% of the clad tube diameter prior to swaging and substantially equal to the difference between the inside diameter of the clad tube prior to swaging and the outside diameter of the fuel bodies contained in the clad tube.

FIGURE 7 shows a series of transverse cross section views illustrating another embodiment of this invention. The description of these views are also conducted in the form of a specific example of the invention applied in the manufacture of rod type nuclear fuel comprising high density sintered UO₂ pellets enclosed within a zirconium alloy tube. The stock tubing had a nominal inside diameter of 0.502 inch, a nominal outside diameter of 0.567 inch, and a nominal thickness of 0.033 inch. The tubing was autoclaved for 36 hours in steam at about 750° F. The tubing was then cut into 27.36 inch lengths and one end sealed with an end plug as described in connection with FIGURE 6. The tube at this stage is shown as 90 in FIGURE 7a.

A strip of type 304 stainless steel foil about 1.7 inches wide (i.e., at least equal to π times the clad tube inside diameter), 27.0 inches long, and about 0.0005 inch in thickness is folded at one end in the form of a funnel and is inserted into the open end of the clad tube 90 to a depth of about 0.5 inch. The tube at this state is shown as 90 in FIGURE 7b with foil 92 inserted at one end.

Sintered high-density UO₂ pellets of about 1.90% enrichment were laid end-to-end along the foil. The foil was folded around the length of pellets, and the foil and pellets were inserted together into the tubing using the foil as a funnel or guide. In the present case a total of 54 pellets about 0.5 inch long and having a nominal outside diameter of 0.496 were loaded into the tube. A void space 0.125 inch long was left at one end of the tube. The thus filled tube was then evacuated, back filled to atmospheric pressure with helium, and the second end plug was welded in place at the other end sealing the fuel rod segment. A transverse cross section view of the fuel rod at this stage is shown in FIGURE 7c in which clad tube 90 is lined with stainless steel foil 92, and the composite clad is filled with the UO₂ pellet fuel 94. A fuel-to-clad gap 96 exists at this stage.

The fuel rods were then cold swaged in a swaging mill using circular dies having a circular opening in the contracted position with a diameter of 0.548 inch. The degree of reduction after swaging did not exceed 0.5 percent of the originally existing outside diameter. These rod segments were reduced to an outside diameter of 0.564 inch, and the cross section view of the resulting fuel rod is as shown in FIGURE 7d. It will be noted that the fuel-to-clad gap 96 has disappeared, the UO₂ fuel 94 lies directly in contact with the inner surface of a composite clad tube including the stainless steel foil liner 92 and clad tube 90. The lateral edges of the foil 92, which overlap at 98 in FIGURE 7c, are bonded together forming a slight bulge 100 which is accommodated in the inner surface of clad tube 90 as indicated in FIGURE 7d. Photomicrographs taken of transverse sections of the nuclear fuel segments prepared as just described show the details as indicated in FIGURE 7d, including the absence of any fuel-to-clad gap. The resulting fuel segments were cleaned on their external surfaces, and may be subjected to further autoclaving to establish the corrosion resistant oxide on the zirconium clad tube.

In general, the diametrical reduction in the clad tubes in the process described in FIGURE 7 is controlled to be not more than 2.5% of the diameter of the clad tube prior to swaging, and substantially equal to the difference between the diameter of the composite clad tube and foil liner and the average of the outside diameters of the individual fuel bodies contained in the composite clad tube.

If desired, temporary removable end plugs may be used during swaging; after which they are removed, the clad tube is trimmed to length, the tube is evacuated to remove any air and then back filled with pure helium, and finally both ends are permanently sealed with end plugs or fittings.

FIGURE 8 shows a transverse cross section view of an annular or tubular nuclear fuel element. A tubular body of fuel 106 is lined on its inner surface with tubular clad 108 and is clad on its exterior surface with outer clad 110. The usual fuel-to-clad gap existing between fuel 106 and outer clad 110 has been eliminated by application of the process of the present invention just as described above. Fuel of the tubular type is particularly useful in nuclear reactors cooled by gases, especially steam which may be introduced at its saturation temperature and superheated during a two pass flow through the inside as well as around the outside of the tubular fuel element shown in FIGURE 8. It is normally not necessary to attempt to apply the swaging procedures of this invention to eliminate the fuel-to-clad gap present adjacent inner clad tube 108 at the time of manufacture. The coefficients of linear expansion of stainless steel, the zirconium alloys, and the other principal materials used as nuclear fuel clad, are sufficiently greater than those of the fuel materials customarily used that the inner clad expands sufficiently by the time operating temperatures are reached that its minimum gap present at manufacture disappears. This is not true of the outer gap which normally increases in size with temperature. By the application of the present invention, however, the outer clad tube is placed in sufficient circumferential tension at room temperature that no gap appears even at operating temperature.

FIGURE 9 is a longitudinal view in partial cross section of a nuclear fuel rod which can be taken either as a view of a prior art fuel rod in which fuel pellets have not been ground or selected to have a uniform outside diameter, or a view of the fuel rod segments according to this invention at the stage indicated in FIGURE 6b (or FIGURE 7c if a foil liner is used) prior to the application of the swaging operation. In FIGURE 9 clad tube 110 is filled with a plurality of fuel pellets 112 having relatively large outside diameter and pellets 114 having a relatively small outside diameter. The fuel-to-clad gap 116 adjacent pellets 112 is thus considerably smaller than the corresponding gap adjacent the smaller pellets 114 in the prior art or conventional nuclear fuel. This gap variation is highly disadvantageous since the smaller diameter fuel pellets 114 are operated with central temperatures on the order of 1000° F. higher than that at the center of the large diameter pellets 112 due to the differences in the fuel-to-clad gap. This temperature difference varies substantially with the composition of the gas and the size of the gap. The temperature difference becomes very high when the helium originally present becomes contaminated with less conductive gases such as the xenon and krypton fission product gases which may be released from the fuel during irradiation.

FIGURE 10 is an enlarged longitudinal partial cross section view of a fuel rod of the type shown in FIGURE 9 following the application of the methods of this invention. In FIGURE 10 clad tube 110 is shown lying directly in contact with the exterior surfaces of the relatively large pellets 112 as well as the relatively small pellets 114. It should be noted that the fuel-to-clad gap 118, present in FIGURE 9, has disappeared. Of particular importance is the fact that the clad tube 110 contacts the exterior surfaces of the relatively small pellets 114 throughout their entire length. During the experimental development of the present invention it was found that this uniformity of contact extending clear to the ends 120 and 122 of fuel pellets 114, could only be attained by using resilient swaging dies having circular openings in the contracted position and undersized by the percentage amounts as indicated above. With steel or other alloy dies, which for these purposes are not resilient, the clad tube 110 fails to contact the outer surface of the relatively smaller pellets 114 over short distances near their ends. This is no problem when the pellets are within close tolerances of a given diameter, or where uniform extensions are used.

The resilient dies referred to above should have a circular opening in the contracted position, and the diameter of this opening is to be no more than 2.5% less than the outside diameter of the resultant fuel rod, just as in the case of the steel or other alloy dies described previously. Resilient dies suitable for application in the methods of this invention are those made of materials having moduli of elasticity between about 30,000 and about 100,000 pounds per square inch such as nylon, the polyfluorinated hydrocarbons known commercially as Teflon, polyethylene, and the like. These materials have lower hardness and modulus of elasticity values than the steel and other alloys customarily used in swaging dies, and have considerable plasticity at room temperature. These properties permit the dies to accommodate the substantial pellet diameter differences illustrated in FIGURES 9 and 10, without placing high compressive loads on the pellets. The result is a zero fuel-to-clad gap along the entire length of even the smallest pellets, and little if any pellet chipping, fracture, or other disturbance.

The length of the resilient die measured along the impact face in a direction parallel to the longitudinal axis of the clad tube is less than the length of individual pellets or other fuel bodies loaded in the fuel segment. This allows the die to force metal into and fill cavities which otherwise form at points 120 and 122 shown in FIGURE 10, thus producing a zero fuel-to-clad gap even at these points. The resilience of these dies allows accommodation of unequal compression loads during swaging at points of contact between small and large diameter pellets.

With fuel rods of about 0.5 inch in diameter, the 2.5% maximum reduction is about 0.0125 inch, and this 12.5 mils is more than sufficient to permit easy manual or machine loading of the clad tubes. It permits easy loading and a single pass in a swaging mill to produce the fuel according to this invention. With larger diameter fuel, such as the tubular fuel sometimes used in gas cooled or steam superheating reactors where two coolant flow passes are employed, two or more swaging steps may be employed using swaging dies having successively smaller openings. In any event, the total diametral reduction in the swaging operation is substantially equal to the difference between the inside diameter of the clad tube prior to swaging and the outside diameter of the smallest fuel bodies contained in the tube. Preferably this difference is made as small as possible, such as between about 5 and 15 mils, in order to provide easy loading of the tubes, reasonably short swaging times, and avoid chipping or other disturbance of the fuel bodies within the clad tube prior to the time they are secured by swaging the tube into direct contact with them. In general, the diametral reduction per pass should not exceed 2.5% of the outside diameter of the clad tube prior to the particular swaging pass.

Referring finally to FIGURE 11, the improvement in thermal performance of nuclear reactor fuel of the rod type through utilization of the present invention is graphically illustrated. The data shown here have been experimentally obtained from the irradiation of experimental rod fuel in VBWR. The nuclear fuel was $UO_2$ or relatively low enrichment as indicated below. The pellet diameter was 0.50 inch in all cases. The fuel was irradiated in a reactor cooled and moderated by boiling light water. Test specimens or segments of rod type fuel clad with zircaloy-2 and type 304 stainless steel were irradiated. The test segments had different fuel-to-clad gaps. In each case the tube was selected and the $UO_2$ pellets ground so that the gaps were closely established in each test segment. Heat fluxes at various positions along the lengths of the test segments were determined from measurements of the thermal neutron flux obtained from gamma traverses in the core, and the known enrichment of the $UO_2$ fuel. Post irradiation examination of the test segments involved an identification of the positions at which incipient central fuel melting or fuel void formation had occurred. The data shown in FIGURE 11 relate the heat flux at these points to the fuel-to-clad gap opposite these points. The following examples serve as illustration of the performance of zircaloy-2 and stainless steel clad fuel of various fuel-to-clad gap sizes.

EXAMPLE 1

A test assembly was prepared for irradiation in VBWR and consisted of nine zircaloy-2 clad fuel rod segments of the conventional kind, but having individual rod test segments whose fuel-to-clad gap varied through the range of 8 mils (0.008 inch) to 16 mils. This test assembly was irradiated in VBWR for a period of about 168 hours during which time the maximum heat fluxes in the test assemblies ranged from below 200 M B.t.u./hr. ft.$^2$ to above about 400 M B.t.u./hr. ft.$^2$. Following the irradiation the test assembly was removed from VBWR, allowed to "cool" for 20 days, and then was examined. From this experiment the data shown in FIGURE 11 on curve 130 were taken. These data are tabulated in the following table.

Table 1
ZIRCALOY-2 CLAD ROD FUEL

| Test Segment No. | Fuel-to-Clad Gap, Mils | Heat Flux [1] M B.t.u./hr. ft.$^2$ | Point on Curve 130 |
| --- | --- | --- | --- |
| 1 | 16 | 272 | 132 |
| 2 | 13 | 303 | 134 |
| 3 | 10 | 339 | 136 |
| 4 | 8 | 357 | 138 |

[1] Required to form central void in fuel.

The point indicated at 138 on FIGURE 11 was taken from a test segment whose fuel-to-clad gap was the smallest attainable with usual prior art clad tube filling procedures, namely those in which pellets and clad tubes are produced within the normal manufacturing tolerances described above, and are not specially selected, and in which the fuel pellets may be manually inserted into the clad tubes.

EXAMPLE 2

In the experimental fuel assembly of Example 1, one test segment included a zircaloy-2 clad tube whose inside diameter had been carefully examined and was found to be within 0.0005 inch of 0.505 inch diameter. This tube was filled with specially prepared and ground $UO_2$ fuel pellets whose outside diameters were also within 0.0005 inch of 0.500 inch diameter. The nominal fuel pellet diameter was thus 3 mils less than the nominal inside diameter of the clad tube. These pellets were forcibly inserted into the clad tube to produce a test segment having a fuel-to-clad gap of 3 mils. This test segment was irradiated in VBWR as described in Example 1. This test segment was removed from the reactor, allowed to cool with the others, and was examined. The maximum heat flux at which this fuel segment could be operated without central void formation was found to be 382 M B.t.u./hr. ft.$^2$. This point is shown as 140 on curve 130 in FIGURE 11. The improvement in reducing this gap to 3 mils is shown to be minimal at best. As a practical matter, in view of the previous impossibility of manufacturing rod fuel with 3 mil fuel-to-clad gaps using conventional tube filling techniques, the improvement to be expected is probably not worth the added expense required to manufacture and select the clad tubing and ground pellets to the close tolerances required.

These data permit a reliable extrapolation of the maximum heat flux as a function of diametral fuel-to-clad gap for the prior art type of zircaloy-2 clad fuel rods. This extrapolation is shown at the left hand end of curve 130 as broken line 142, its intercept at point 144 being 390 M B.t.u./hr. ft.$^2$ The improvement which could be expected from eliminating the residual 3 mil gap would be very small, namely an increase in maximum heat flux from 382 to 390 M B.t.u./hr. ft.$^2$, and was in fact impossible to obtain prior to the development of the present invention.

EXAMPLE 3

Experiments similar to those of Example 1 using another test fuel assembly were conducted in VBWR. Test fuel segments in these experiments were clad with type 304 stainless steel. These test segments had different fuel-to-clad gaps, and were fabricated into a rod fuel assembly having 9 individual segments arranged 3 x 3. This assembly was irradiated in VBWR over a period of about 336 hours. During this time the maximum heat flux at which this assembly was operated varied from below about 200 M B.t.u./hr. ft.$^2$ to above about 400 M B.t.u./hr. ft.$^2$. The test assembly was removed from the reactor, allowed to "cool" for one month, and then was examined to correlate the maximum heat flux needed to cause central void formation with the fuel-to-clad gap. The experimental data are plotted as curve 150 in FIGURE 11 and are tabulated in the following Table 2.

Table 2
TYPE 304 STAINLESS STEEL CLAD ROD FUEL

| Test Segment No. | Fuel-to-Clad Gap, Mils | Heat Flux,[1] M B.t.u./hr. ft.$^2$ | Point on Curve 130 |
|---|---|---|---|
| 1 | 13 | 266 | 152 |
| 2 | 10 | 306 | 154 |
| 3 | 7 | 339 | 156 |

[1] Required to form central void in fuel.

The point indicated as 156 constitutes the minimum permissible gap using pellets ground to within ±0.002 inch and stainless steel clad tubing whose inside diameter has a tolerance of ±0.0025 inch.

These data, taken in conjunction with those shown along curve 130 in FIGURE 11, permit a reliable extrapolation along curve 158 to a theoretical maximum value of 380 M B.t.u./hr. ft.$^2$ at point 160 which might be expected at zero fuel-to-clad gap, it being recognized that no manufacturing process heretofore existed by means of which such fuel could be manufactured. Again, the improvement anticipated from such a gap reduction appeared minimal, i.e., 339 to 380 M B.t.u./hr. ft.$^2$.

The process of this invention provides the means whereby the 7–8 mil minimum fuel-to-clad gap realized using usual manufacturing methods, and the 3 mil minimum gap using extraordinary procedures, may be eliminated. It permits the production of rod fuel, in which throughout its operating temperature range, the clad lies in direct and continuous contact with the external surface of the individual fuel bodies, i.e., the fuel has a zero fuel-to-clad gap. In the experimental verification of this invention three surprising things were found. The first was that special circular swaging dies are required rather than the oval dies customarily used in swaging mills. The second was that the diameter of the circular opening in these dies when in the contracted position must be from 0.2% to 2.5% less than the desired diameter of the rod fuel to be produced. Both of these considerations are essential to eliminate the usual fuel-to-clad gap even at operating fuel temperatures without crushing or otherwise disturbing the hard high density form of a sintered pellet. The third unexpected result was found during irradiation testing of fuel segments produced according to this invention. It was found that they were capable of sustaining heat fluxes on the order of 200% of those which would have been reasonably expected based on the extrapolation of curves 130 and 150 in FIGURE 11.

The following examples describe the experimental data derived in testing zircaloy and stainless steel clad rod fuel embodying the invention. These data are also plotted on FIGURE 11 to permit a direct comparison.

EXAMPLE 4

An experiment was performed, similar to those of Examples 1 and 2, in which another test assembly having zircaloy-2 clad $UO_2$ fuel test segments was irradiated. One test segment was prepared from $UO_2$ fuel pellets and zircaloy-2 clad tubing which were ground to identical outside and inside diameters, respectively, using special and extremely precise techniques. The clad tube was then heated slightly to expand it, and the pellets, which were at a lower temperature, were inserted. This special test segment had a fuel-to-clad gap of zero. Thermocouples were placed in the fuel pellet and its central temperature was recorded during irradiation. Other zircaloy-2 clad test segments, prepared according to the methods of this invention and having a zero gap, were also irradiated. It was found that the effective thermal conductivity of the special test segment, provided with the thermocouples, was about 2.5 times that of similar test segments having a fuel-to-clad gap of 3 mils. It was also found that the heat flux required to produce central void formation in the special test segment, and in those prepared by the methods of this invention, averaged 720 M B.t.u./hr. ft.$^2$. This is shown as point 162 on FIGURE 11, and the radical increase in thermal performance which was unexpectedly found in test segments having fuel-to-clad gaps approaching and equal to zero are indicated by broken line 164.

EXAMPLE 5

Experiments corresponding to those of Example 4 were conducted using type 304 stainless steel clad fuel. The thermal conductivity increase noted was about 230% of that determined with a special test segment having a 3 mil gap. The heat flux required to produce central void formation in the test segments was determined to be 680 M. B.t.u./hr. ft.$^2$. This heat flux is shown as point 166 on FIGURE 11 and broken curve 168 shows the radical increase in thermal performance of such fuel as the fuel-to-clad gap approaches and becomes equal to zero.

The methods of the present invention are capable of producing rod-type nuclear fuel having unusual heat transfer properties, and do not require the use of the expensive and exceedingly difficult precision-grinding and shrink-fitting procedures employed in the preparation of the special test segments of Examples 4 and 5.

The following examples illustrate the deleterious effects of water and steam upon the zirconium alloy clad of a prior art fuel element where the clad tube fails and water or steam penetrates the clad tube and comes in contact with the fuel.

EXAMPLE 6

A deliberately defected zircaloy-2 clad fuel rod containing cracked pellets of high density sintered $UO_2$ was irradiated in VBWR. The fuel pellet diameter was 0.50 inch, the fuel-to-clad gap was originally 10 mils. A 20 mil diameter hole was drilled radially through the clad tube near its upper end to permit entry of water in order to examine effects on fuel rod performance. This test segment was irradiated in VBWR at heat transfer rates in the range of about 350 M B.t.u./hr. ft.$^2$ for 32 hours. The test segment following irradiation was allowed to cool for 1 month and then was examined. It was observed that central void formation had occurred, that water had entered the clad tube, and that there was a highly localized corrosion attack on the interior surface of the clad tube opposite every crack in the $UO_2$ pellets. Photomicrographs of this section indicated the highly localized corrosion area to be surrounded with hydride platelets, their concentration decreasing with distance radially through the clad tube wall away from the corrosion site. It is believed, though not certainly established, that this localized corrosion results from migration of water through the clad tube defect, through the existing pellet cracks, and into the central portion of the pellets when they are relatively cool, such as when the reactor is shut down or operating at a relatively low power. When the reactor power is increased, the central fuel temperature rises converting this water into high pressure steam which then rushes toward the cooler portions of the fuel through the existing cracks. The hydriding and corrosion of the zircaloy-2 clad tube occurs at those positions where the superheated steam impinges on the inside wall of the clad tube. It may be that this expulsion of steam from the pellet creates a reduced pressure region into which additional steam-water mixture enters from the ambient body moderator-coolant water, or that water and/or steam re-enter this region during subsequent periods when the reactor power level is again lowered, and the fuel temperature drops.

EXAMPLE 7

Two test segments of rod type nuclear fuel were produced according to the present invention. These segments contained sintered $UO_2$ pellets of 98% theoretical density and 2.3% enrichment, had a zircaloy-2 clad tube 0.567 inch in outside diameter, 0.030 inch in wall thickness, and which contained type 304 stainless steel foil liner 0.0005 inch thick between the clad tube and the pellets. A 20 mil diameter hole was drilled in each clad tube, just as was done with the fuel rod of Example 6. These test segments were irradiated in VBWR for a period of 3 days under conditions where the heat transfer rate varied to values of about 350 M B.t.u./hr. ft.$^2$. These segments were removed from the reactor and allowed to cool. Post-irradiation examination of the fuel elements indicated that although water and steam had indeed entered the fuel rod through the defect (as indicated by water stains or discoloration of the tube surfaces), there was no sign of oxidation or corrosion on the zircaloy clad tube, or the severe cracking of the tube observed in Example 6, where no stainless foil was employed.

The foregoing examples illustrate clearly the improved heat transfer capabilities of rod fuel elements according to this invention, and also illustrate the virtually complete elimination of corrosive attack on zirconium alloy clad tubes which otherwise occurs when water enters a fuel rod whose interior is not protected by the stainless steel foil as described above. The improved rod fuel element described in connection with FIGURE 7, the performance of which is illustrated in the foregoing Example 7, has the combined advantages of freedom from the propagating failure due to steam corrosion and hydride which is characteristic of stainless steel, and the excellent neutron economy characteristic of the zirconium alloys.

The following examples illustrate the design and performance of a dual cycle boiling water reactor power plant utilizing 0.5 inch outside diameter zircaloy-2 clad fuel elements fabricated according to the prior art techniques (Example 8), and the power output increase which is realized when the reactor is provided with the same size fuel elements having zircaloy-2 clad, a stainless steel foil liner, and a fuel-to-clad gap of zero, manufactured according to the principles of the present invention (Example 9).

EXAMPLE 8

A large dual cycle boiling water reactor power plant, having a gross electrical output of 192,000 kilowatts, had a reactor core rated at 630,000 thermal kilowatts. The core consisted of 80 cruciform control elements of 2% boron stainless steel, and 452 nuclear fuel assemblies each containing 36 fuel rods in a 6 x 6 array on a square pitch space approximately 0.75 inch center-to-center. Each fuel rod was approximately 10 feet long, made up of four segments each about 30 inches long. The fuel clad was zircaloy-2 about 0.030 inch in wall thickness and was filled with sintered $UO_2$ pellets of 1.50% enrichment and about 0.494 inches outside diameter. The fuel-to-clad gap was about 10 mils. The reactor core was approximately 10 feet in diameter, was cooled by a flow of about 25 million pounds per hour of light water, and produced a steam output of about 1.5 million pounds per hour at 1000 p.s.i.a. and the saturation temperature of 546° F. The average heat transfer rate of this fuel was about 100 M B.t.u./hr. ft.$^2$, with peak heat transfer rates at certain portions of the core of about 300 M B.t.u./hr. ft.$^2$. The power output of this fuel was limited by the central temperature of the fuel which was held below the melting temperature at the 300 M B.t.u./hr. ft.$^2$ positions.

EXAMPLE 9

The boiling water nuclear power plant described in Example 8 produces a gross electrical output of 400,000 kilowatts with the reactor core producing 1,310,000 kilowatts thermal using the improved fuel according to this invention. The reactor core is identical to that in the power plant described in the preceding example, except that the zircaloy clad $UO_2$ fuel rods are provided with the 0.0005 inch thick stainless steel liner and have a zero fuel-to-clad gap. The wall thickness of the zircaloy clad tube after swaging averaged 0.033 inch, and the outside diameter of the finished fuel rods was 0.561 inch. The heat flux at which central fuel melting and void formation occurred in this fuel was 680 M B.t.u./hr. ft.$^2$. The average heat flux in this improved core is 208 M B.t.u./hr. ft.$^2$, with peaks at 625 M B.t.u./hr. ft.$^2$. The peak heat flux is 92 percent of that at which central melting and void formation occur in this improved fuel.

The present invention has been described and illustrated above in considerable detail with respect to stainless steel and zirconium alloy clad $UO_2$ fuel. These specific materials have been selected for purposes of illustration because the invention has been tested with these specific materials and because they are currently in extensive use in nuclear reactors now being constructed and operated. The principles of the present invention are not, however, limited to these materials, but may be applied to other clad and fuel materials. For example, the metallic clad tubes may be fabricated from aluminum, beryllium, magnesium, nickel, niobium (columbium), and alloys thereof having low neutron absorption cross sections in the energy range in which the fuel is to be used. Clad tubes may also be fabricated of metals in which have been dispersed certain additives such as refractory oxides. Sintered aluminum and sintered zirconium products containing dispersed aluminum and zirconium oxides are malleable corrosion-resistant materials suitable for use as clad tubes in the present invention. The nuclear fuel may contain either fissionable or fertile isotopes of uranium, plutonium, or thorium, or mixtures of these materials. The materials may be present in elemental form, or as compounds such as the oxides described above, or as the carbides, silicides, nitrides, sulfides, or the like.

In water or steam cooled or moderated nuclear reactors, fuel clad with zirconium and its alloys or niobium and its alloys, is subject to deleterious effects of water or steam illustrated above in Example 6. These effects are avoided in the practice of this invention using the clad tube liner and swaging the fuel rods to produce a zero fuel-to-clad gap as described above and illustrated in Example 7. Although stainless steel has been described and illustrated as a suitable liner resistant to the effects of steam and water, other materials which can be used include nickel, iron and chromium alloys having high corrosion resistance to high temperature water and steam. The thickness of the foils should be the lowest possible value since the neutron absorption cross sections of these liner materials are relatively high. Foil production and steam/water corrosion rate considerations limit the minimum foil thickness to about 0.0002 inch, neutron economy considerations limit the maximum foil thickness to about 0.002 inch.

Swaging mills suitable to practice the methods of this invention are commercially available. However, the circular swaging dies are not, but are readily made following the teachings herein. Such mills generally swage tubes and rods in a horizontal position. In the practice of this invention it is preferred to support the tubes fed to and removed from the swaging mill by some means such as a trough or other support and guiding means.

The invention was described above by way of an application of the invention to the production of rod-type nuclear fuel elements for use in a nuclear reactor used for power generation purposes, which had a thermal neutron spectrum, and which was cooled and moderated by boiling light water. Persons skilled in the art can from this description, and from known nuclear engineering and physics principles, apply this invention to boiling water reactors moderated or cooled, or both, by heavy water (deuterium oxide—$D_2O$), or mixtures thereof with light water, or to pressurized water rectors in which fuel is moderated and cooled by either light or heavy water or mixtures thereof under pressure sufficiently high to prevent its vaporization. The nuclear fuel and the process of this invention is also readily applicable to nuclear reactors moderated and cooled by hydrocarbonaceous materials such as diphenyl, the isomeric terphenyls, and other organic materials having reasonably good radiation stability. The present invention is also applicable to the other forms of nuclear reactors which may be cooled by liquid metals such as sodium, potassium, the eutectic mixture NaK, and the like. Further, the invention is applicable to graphite or beryllium moderated reactors having the improved fuel of the invention located in channels penetrating the solid moderator and through which a coolant fluid is passed. The invention is also applicable to unmoderated reactors in which the neutron spectrum is epithermal, that is, the intermediate and fast reactors. The described improvement in fuel performance is realized in any of these cases.

The present invention should not be considered as limited to nuclear reactor fuel elements and manufacturing methods therefor, since it is applicable as stated above to malleable tube-clad articles containing hard high density bodies of cylindrical shape having a body-to-clad gap of zero, such as metal clad electric resistance heaters, and other clad or sealed articles.

Particular embodiments of this invention have been described above in considerable detail by way of illustration. It should be understood that various other modifications and adaptions thereof may be made by those skilled in this particular art without departing from the spirit and scope of this invention as set forth in the following claims:

I claim:

1. A method for producing malleable tube-clad articles which comprises passing a malleable tube containing at least one hard high density material body of cylindrical shape at least once through a swaging mill provided with swaging dies having a circular opening in the contracted position to effect a diametral reduction of said tube by an amount substantially equal to the difference between the inside diameter of said tube prior to swaging and the outside diameter of the smallest material body contained in said tube and produce said article having a material body-to-clad gap of zero, the diameter of said circular opening in said dies being between about 0.2% and about 2.5% less than the diameter of said tube following swaging.

2. A method according to claim 1 wherein the diametral reduction per pass through said swaging mill does not exceed 2.5% of the outside diameter of said tube prior to the particular swaging pass.

3. A method according to claim 1 wherein said swaging dies are resilient, having a modulus of elasticity of between about 30,000 and 100,000 pounds per square inch.

4. A method according to claim 3 wherein the length of the impact face of said resilient die measured parallel to the longitudinal axis of the clad tube is less than the length of the individual material body contained in said clad tube.

5. A method according to claim 1 in combination with the step of introducing into said tube prior to swaging a thin foil liner adjacent the internal surface of said tube.

6. A method for producing malleable tube clad rod-type nuclear fuel elements having a zero fuel-to-clad gap which comprises passing a malleable clad tube containing at least one hard high-density nuclear fuel body of cylindrical shape at least once through a swaging mill provided with swaging dies having a circular opening in the contracted position to effect a diametral reduction of said clad tube by an amount substantially equal to the difference between the inside diameter of said clad tube prior to swaging and the outside diameter of the smallest fuel body contained in said tube, the diameter of said circular opening being between about 0.2% and about 2.5% less than the diameter of said clad tube following swaging.

7. A method according to claim 6 wherein said diametral reduction of said clad tube does not exceed 2.5% of the outside diameter of said tube prior to the particular swaging pass.

8. A method according to claim 6 wherein said swaging dies are resilient, having a modulus of elasticity between about 30,000 and about 100,000 pounds per square inch, and wherein the length of said dies measured along the impact face thereof in a direction parallel to the longitudinal axis of said tube during swaging is less than the length of said nuclear fuel body measured in the same direction and contained in said clad tube.

9. A method for producing metallic tube clad nuclear reactor fuel elements of the rod type which comprises inserting into a metallic clad tube a plurality of hard high density nuclear fuel bodies of cylindrical shape, and swaging the thus loaded clad tube by means of a swaging mill provided with swaging dies having a circular opening in the contracted position, the diameter of said circular opening being between about 0.2% and about 2.5% less than the diameter of said clad tube following swaging, whereby the swaging operation effects a diametral reduction of said clad tube by an amount substantially equal to the average of the differences between the inside diameter of said clad tube prior to swaging and the outside diameters of each of said plurality of fuel bodies in said tube to place the inner surface of said clad tube in direct and continuous contact with the outer surface of said fuel bodies.

10. A method according to claim 9 in combination with the step of providing a thin metallic foil in said clad tube at a position between the outer surface fuel bodies and the internal surface of said clad tube, said foil being between about 0.0002 and about 0.002 inch in thickness to protect said internal surface from adverse effects of fluids issuing from said fuel bodies.

11. A method according to claim 10 wherein said clad tube is fabricated of a material selected from the class consisting of zirconium and its alloys and niobium (columbium) and its alloys, and said foil liner is fabricated of a material selected from the class consisting of the type 300 stainless steels, nickel, alloys of iron and nickel, alloys of nickel and chromium, and alloys of aluminum, iron and chromium having high corrosion resistance to high temperature water and steam.

12. A method for producing rod type nuclear reactor fuel elements which comprises selecting a clad tube fabricated of a metal containing a substantial proportion of zirconium, inserting at one open end of said clad tube one end of a strip of stainless steel foil having a thickness of between about 0.0002 and about 0.002 inch, of at least $\pi$ times the clad tube inside diameter, and a length substantially equal to that of the clad tube, the inserted end of said strip being folded laterally as a funnel, aligning a plurality of hard high density nuclear fuel bodies cylindrical shape along said foil strip, folding said foil around the aligned fuel bodies and inserting said foil and said bodies into said tube, and swaging the thus loaded clad tube by passing it at least once through a swaging mill with swaging dies which in the contracted position present a circular opening having a diameter between about 0.2% and 2.5% less than the diameter of said clad tube following swaging to effect a diametral reduction of said clad tube substantially equal to the difference between the inside diameter of the composite clad tube and foil liner and the average of the outside diameters of said fuel bodies to place the inner surface of said composite clad tube and foil liner in direct contact with the outer surface of said fuel bodies throughout the entire length of each individual fuel body.

13. A method according to claim 12 wherein said swaging dies are fabricated of a resilient material having a modulus of elasticity between about 30,000 and about 100,000 pounds per square inch, and wherein the length of the impact face of said dies, measured along said face in a direction parallel to the longitudinal axis of said tube is less than the length of the individual fuel bodies measured in the same direction and contained in said clad tube.

References Cited in the file of this patent

UNITED STATES PATENTS

| | | |
|---|---|---|
| 1,866,145 | Wilson | July 5, 1932 |
| 2,856,340 | Wigner et al. | Oct. 14, 1958 |
| 2,872,401 | Wigner et al. | Feb. 3, 1959 |
| 2,915,815 | Bean et al. | Dec. 8, 1959 |